United States Patent [19]

Yamauchi et al.

[11] Patent Number: 4,527,093
[45] Date of Patent: Jul. 2, 1985

[54] EXPOSURE AMOUNT CONTROL DEVICE FOR A COPYING MACHINE

[75] Inventors: Koji Yamauchi, Hitachi; Shoichi Ito, Ibaraki; Hiroyuki Tadokoro, Hitachi, all of Japan

[73] Assignee: Hitachi, Ltd., Tokyo, Japan

[21] Appl. No.: 546,095

[22] Filed: Oct. 27, 1983

[30] Foreign Application Priority Data

Oct. 29, 1982 [JP] Japan .................................. 57-188956

[51] Int. Cl.³ ...................... H05B 39/09; G03B 27/72
[52] U.S. Cl. ......................................... 315/307; 355/69
[58] Field of Search .................. 355/14 R, 14 C, 67, 355/68, 69; 315/156, 158, 306, 307; 323/322, 323, 324, 326, 902

[56] References Cited

U.S. PATENT DOCUMENTS 4,359,670 11/1982 Hosaka et al. ..................... 315/307

Primary Examiner—John Gonzales
Assistant Examiner—Douglas S. Lee
Attorney, Agent, or Firm—Antonelli, Terry & Wands

[57] ABSTRACT

Disclosed is an exposure amount control device for a copying machine comprising an exposure amount control circuit for controlling an exposure amount by controlling light of the exposure lamp for illuminating an original document to be copied and a digital light control signal generator for supplying a digital light control signal of a variable duty factor to the exposure amount control circuit. The digital light control signal generator includes a light intensity increase/decrease setting circuit and an oscillator for generating an oscillation output of a variable oscillation period in accordance with a light intensity signal from the light intensity increase/decrease setting circuit. The oscillation output of the oscillator is converted to an on-off light signal, which is supplied to the exposure amount control circuit as the digital light control signal. Thus, the digital light control signal generator is perfectly electrically isolated from a primary power supply circuit of the exposure amount control circuit and a highly safe exposure amount control device with a stable control ability due to an on-off light signal is provided.

2 Claims, 11 Drawing Figures

RA—$V_{LP}$ CHARACTERISTIC

EXPOSURE AMOUNT CONTROL DEVICE FOR A COPYING MACHINE

The present invention relates to an exposure amount control device, and more particularly to an exposure amount control device suitable for use in a copying machine.

Figure 1:
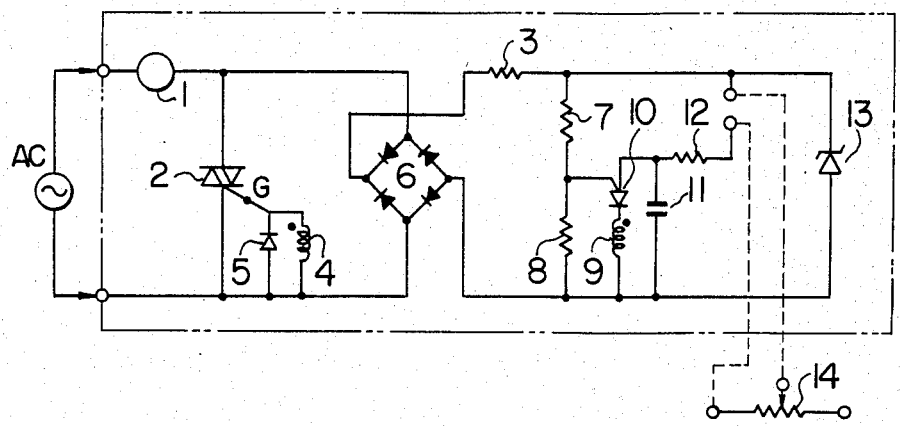

In a prior art exposure amount control device for a copying machine as shown in FIG. 1, an AC voltage applied to an exposure lamp 1 is controlled by an AC control element 2 to vary the exposure amount of the exposure lamp 1. By setting a potentiometer 14 to a desired position, the operation timing of a pulse generator 10 is controlled so that the firing phase of the AC control element 2 is determined and a desired magnitude of AC voltage is applied to the exposure lamp 1.

The potentiometer 14 is usually mounted on an operation panel of the copying machine and adjusted when copies are to be made. As seen from FIG. 1, the potentiometer 14 is connected to a primary power supply through a resistor 3 and a bridge rectifier 6. In such a system, since the potentiometer is handled as a primary circuit part under safety regulations, the construction, the wiring and mounting thereof must comply with the safety regulations and hence the device is complex and expensive.

In a certain device an insulation transformer is used in a power supply circuit for a control circuit to isolate the control circuit from the primary circuit. In such a device, however, the transformer must comply with safety regulations and hence device is complex, of large size and expensive.

It is an object of the present invention to provide an exposure amount control device for a copying machine which isolates the exposure amount setting means from the primary circuit, has a high safety, can stably set the exposure amount and is inexpensive.

According to one aspect of the present invention, there is provided an exposure amount control device for a copying machine comprising exposure amount control means for controlling the exposure amount by controlling the light of an exposure lamp for illuminating an original document to be copied and digital light control signal generating means for supplying a digital light control signal of a variable duty factor to the exposure amount control means.

Figure 2:
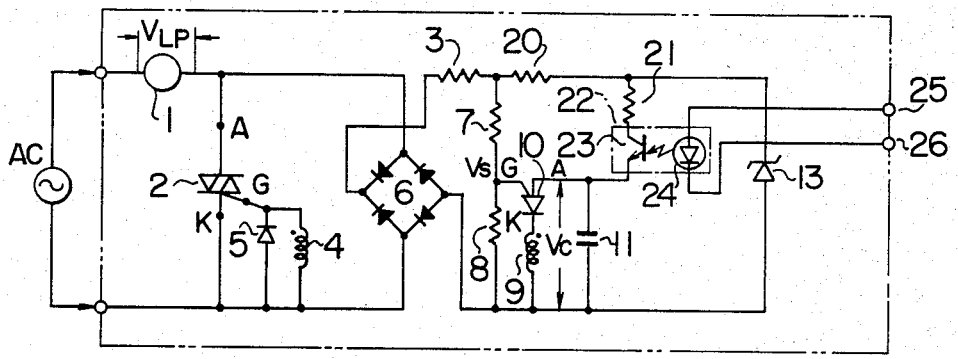
Figure 3:
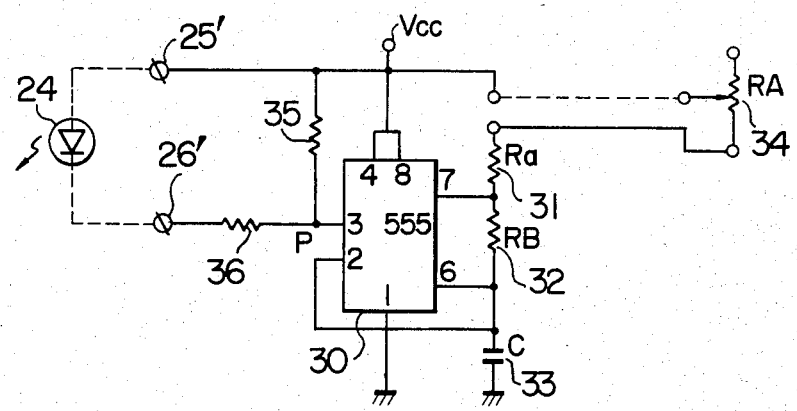
Figure 4:
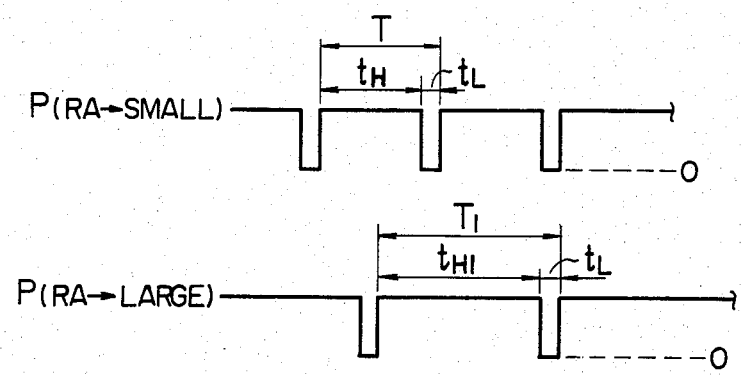
Figure 5:
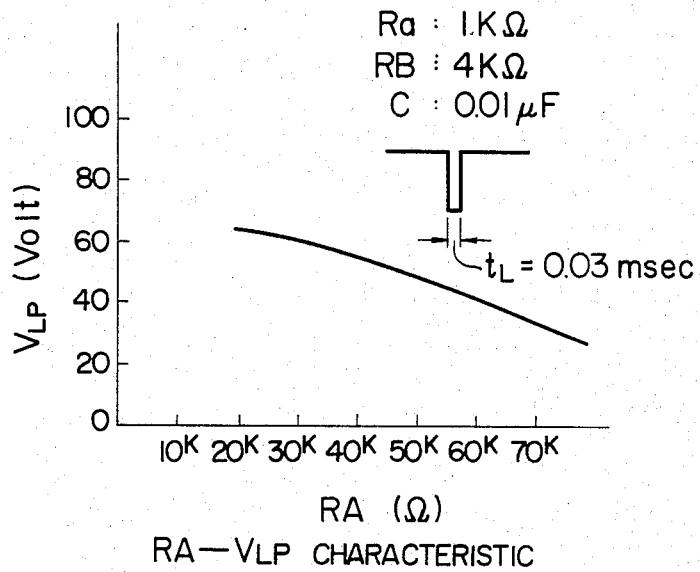
Figure 6:
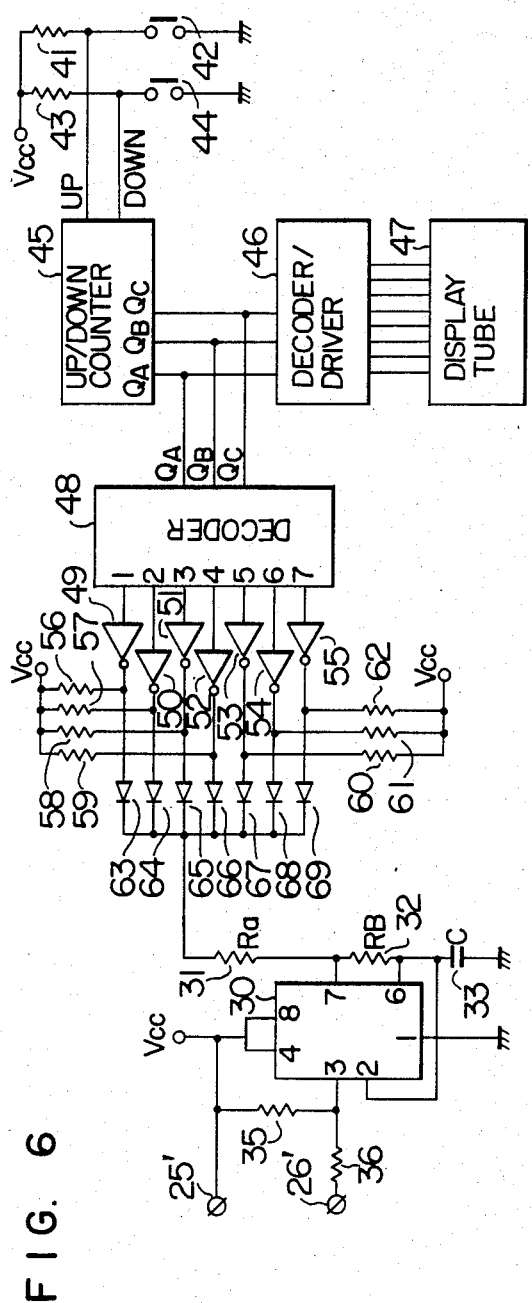
Figure 7:
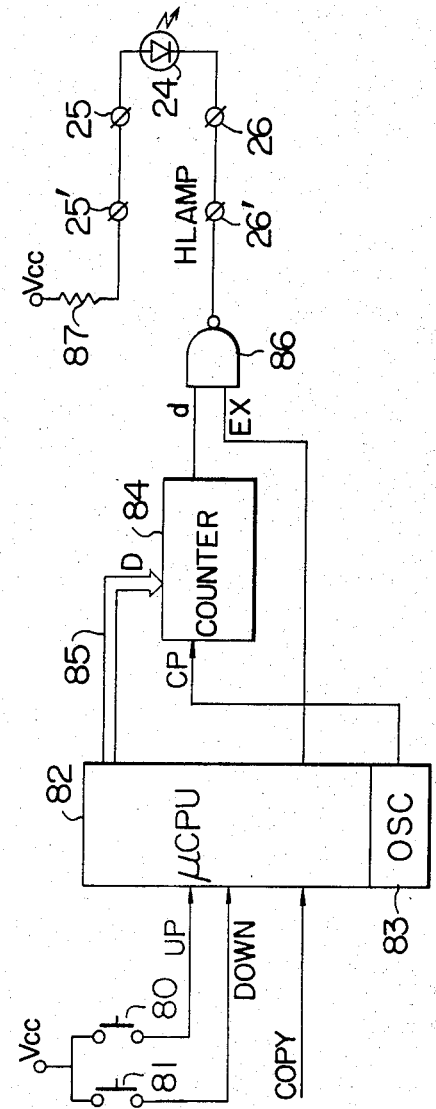

The above and other objects, features and advantages of the present invention will be apparent from the following detailed description of the preferred embodiments of the invention in conjunction with the accompanying drawings, in which:

FIG. 1 is a circuit diagram of a prior art exposure amount control device for a copying machine, FIG. 2 is a circuit diagram of an exposure amount control device for a copying machine in accordance with the present invention, FIG. 3 is a circuit diagram of a light control signal generator of the present invention, FIG. 4 shows an output signal of the light control signal generator of the present invention, FIG. 5 shows a characteristic chart of a resistance of a potentiometer and an applied voltage to a lamp of the exposure amount control device of the present invention, FIG. 6 is a circuit diagram of another embodiment of the present invention in which the exposure amount is controlled by a digital signal with a digital indication, FIG. 7 is a circuit diagram of other embodiment of the present invention in which the exposure amount is controlled by a microcomputer, FIGS. 8(a) and (b) are a flow chart of a program necessary to generate a light control signal by the microcomputer, and FIGS. 9(a) and (b) shows waveforms of the light control signals having duty factors of 50% and 25%.

Referring to FIGS. 2 and 3, one embodiment of the present invention is now explained.

FIG. 2 shows one embodiment of the exposure amount control device which receives a light control signal from light control signal generating means.

In FIG. 2, the same numerals as those of FIG. 1 designate the same circuit components. Instead of the potentiometer 14 of FIG. 1, the following circuit components are used; resistors 20 and 21 and a photocoupler 22 including a light emitter 24 and a photosensor 23.

A construction of the exposure amount control device of the present invention shown in FIG. 2 is now described.

The exposure lamp 1 for illuminating an original document is connected to an external AC power supply AC in series with the AC control element 2. A secondary coil 4 of a pulse transformer and a cathode of a flywheel diode 5 are connected to a gate terminal G of the AC control elements. The other end of the secondary coil 4 of the pulse transformer and an anode of the flywheel diode 5 are connected to one end of the external AC power supply AC. Input terminals of a bridge rectifier 6 are connected across the AC control element 2, and voltage dividing resistors 3, 7 and 8 are connected in series to output terminals of the bridge rectifier 6. The resistor 3 is connected to the resistor 7 and a resistor 20 and the other end of the resistor 7 is connected to the resistor 8 and a gate terminal G of the pulse generator 10, the other end of the resistor 8 is connected to the negative output terminal of the bridge rectifier 6, the other end of the resistor 20 is connected to a resistor 21 and a constant voltage element 13, the other end of the resistor 21 is connected to the photosensor 23 of the photocoupler 22, the other end of the photosensor 23 is connected to a capacitor 11 and an anode terminal A of the pulse generator 10, a cathode terminal K of the pulse generator 10 is connected to a primary coil 9 of the pulse transformer, and the other end of the primary coil 9, the other end of the capacitor 11 and the other end of the constant voltage element 13 are connected to the negative output terminal of the bridge rectifier 6. The anode terminal and the cathode terminal of the light emitter 24 of the photocoupler 22 are connected to terminals 25 and 26, respectively, which are connected to the light control signal generator.

Referring to FIG. 3, one embodiment of the light control signal generator of the present invention is explained.

A timer circuit 30, resistors 31 and 32, a capacitor 33 and an exposure amount setting potentiometer 34 form an astable multivibrator. Output resistors 35 and 36 are connected to an output terminal 3 of the timer circuit 30. The other end of the resistor 36 is connected to an output terminal 26'. The light emitter 24 of the photocoupler 22 of FIG. 2 is connected to the output terminals 25' and 26' of FIG. 3.

The operation of the present embodiment is now described. An output P of the astable multivibrator formed by the timer circuit 30 (Hitachi HA 17555)

changes its oscillation period T and ON/OFF duty factor as the potentiometer 34 (RA) is changed, as shown in FIG. 4. In general, they are expressed by $$t_H = 0.693(Ra + RA + RB) \cdot C$$

$$t_L = 0.693 RB \cdot C$$

Duty factor $D = RB/(Ra + RA + 2RB)$

The output of the present light control signal generator is supplied to the exposure amount control circuit through the photo-coupler 22. The output P of the astable multivibrator is supplied to the light emitter 24 of the photo-coupler 22 through the resistor 36. Thus, the light emitter 24 is turned on and off in accordance with the output signal P shown in FIG. 4. It is detected by the photosensor 23 so that it is turned on and off. During the ON time of the photosensor 23 (during the $t_L$ period of the output signal P) a charging current flows into the capacitor 11 through the resistor 21 and the photosensor 23 so that the capacitor 11 is charged. When a voltage Vc across the capacitor 11 exceeds Vs, the terminals A and K of the pulse generator 10 are shorted and the capacitor 11 is discharged through the primary coil 9 of the pulse transformer. As a result, a pulse signal is transmitted to the secondary coil 4 and it is supplied to the gate terminal G of the AC control element 2. Thus, the AC control element 2 is fired at a phase angle $\theta$ and a voltage is applied to the lamp 1. Since the duration $t_L$ of the output P of the astable multivibrator is constant, the oscillation period T increases, the duty factor D decreases and the voltage applied to the lamp 1 decreases as the resistance of the potentiometer 34 (RA) increases. Conversely, as the resistance of the potentiometer 34 (RA) decreases, the oscillation period T decreases, the duty factor D increases and the voltage applied to the lamp 1 increases. The relation between the resistance of the potentiometer (RA) of the exposure amount control device and the voltage $V_{LP}$ applied to the lamp 1 in the present embodiment is shown in FIG. 5. It proves the function described above.

Thus, the present embodiment converts the light signal to a light on/off signal and supplies it to the exposure amount control circuit and enables a perfect electrical insulation of the light control signal generator from the primary power supply. Accordingly, a highly safe exposure amount control circuit is provided.

FIG. 6 shows an embodiment in which the light intensity signal is supplied by a digital signal with a digital display.

The light intensity signal is produced by a light intensity increase switch 42, a light intensity decrease switch 44, an up/down counter 45, a seven-segment decoder/driver 46, a display tube 47, a decoder 48, inverters 49-55, light intensity weighting resistors 56-62 and diodes 63-69. An output of the up/down counter 45 which is counted up and down by the light intensity increase/decrease switches is decoded by the seven-segment decoder/driver 46 and the light intensity signal is displayed by the display tube 47 by a digit 1-7. The outputs 1-7 decoded by the decoder 48 are inverted by the inverters 49-55 connected to the respective output terminal. The outputs of the inverters 49-55 are supplied to the resistors 56-62, respectively. Assuming that the output signal 1 is a minimum light intensity signal and the light intensity is increased stepwise to produce a maximum output signal 7, the resistances of the resistors 56-62 are weighted such that the resistances are $56 > 57 > 58 > 59 > 60 > 61 > 62$. When the output signal of the decoder 48 is 1, the output terminal of the inverter 49 assumes an H level (and other output terminals assume L levels). Thus, the resistor 56 is connected to the resistor 31 (Ra) through the diode 63 so that the astable multivibrator oscillates with a maximum oscillation period T and a minimum voltage is applied to the lamp 1 and the exposure amount is minimum. On the other hand, when the output signal 7 is produced, the resistor 62 is connected to the resistor 31 (Ra) through the diode 69. Thus, the astable multivibrator oscillates with a minimum oscillation period T and a maximum voltage is applied to the lamp 1 and the exposure amount is maximum.

FIG. 7 shows other embodiment of the present invention which uses a microcomputer in the light control signal generator. Output signals from a light intensity increase switch 80 and a light intensity decrease switch 81 are applied to a microcomputer ($\mu$ CPU) 82. The data from the microcomputer ($\mu$ CPU) 82 is supplied to a frequency dividing counter 84 through a data bus 85. A clock CP is supplied from an oscillator (OSC) 83 in the microcomputer ($\mu$ CPU) 82 to the frequency dividing counter 84. An output signal of the frequency dividing counter 84 is supplied to one input terminal of a NAND circuit 86 and an ON signal EX of the lamp 1 (see FIG. 2) is supplied to the other input terminal. An output of the NAND circuit 86 is supplied to an output terminal 26 of the light control signal generator.

Figure 8:
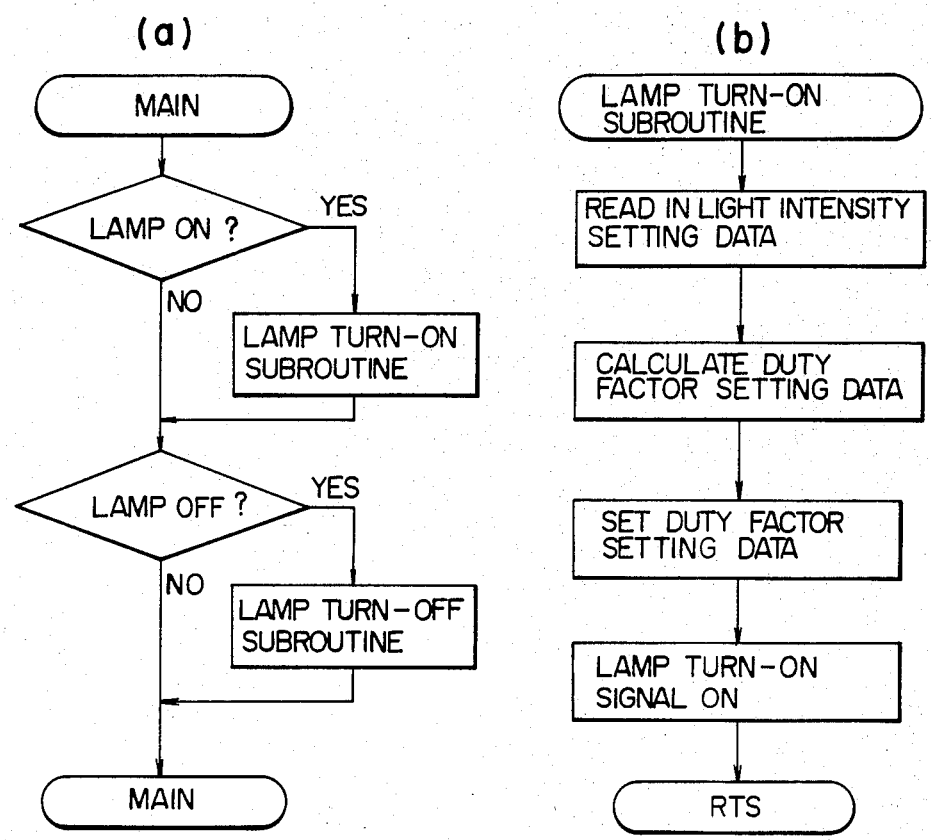
Figure 9:
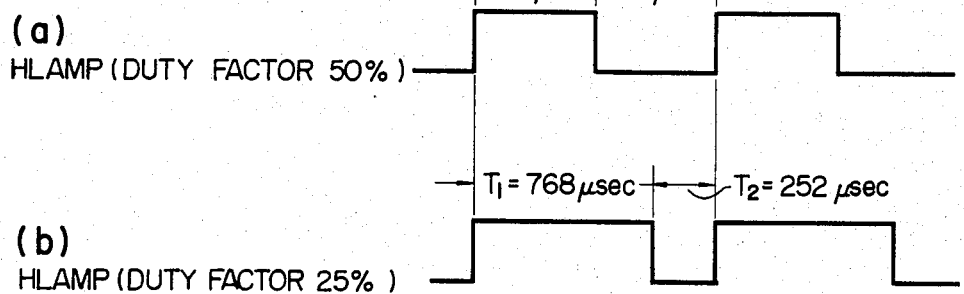

Referring to FIGS. 8 and 9, the operation of the present embodiment is explained.

FIG. 8 shows a flow chart of a program required to generate the light control signal by the microcomputer ($\mu$ CPU) 82. FIG. 8(a) shows a flow chart of a lamp turn-on main program and FIG. 8(b) shows a flow chart of a lamp turn-on subroutine. In FIG. 8(a), when a copy signal COPY is applied, the lamp turn-on subroutine program is executed. That is, the program shown in FIG. 8(b) is executed. Thus, the light control signal HLAMP shown in FIG. 9 is produced. FIG. 9(a) shows the light control signal when the duty factor is 50%, and FIG. 9(b) shows that signal when the duty factor is 25%. In the present embodiment, the clock CP is generated by frequency dividing the oscillation output at 1 MHz from the oscillator 83 by a factor of four by the frequency dividing counter 84 which is a $2^7$ (=255)-bit counter. The light control signal HLAMP has a period T of approximately 1018$\mu$ seconds and a turn-on time $T_2$ of the light emitter 24 of the photocoupler is approximately 508$\mu$ seconds when the duty factor is 50%, and approximately 252$\mu$ seconds when the duty factor is 25%.

In the present embodiment, by setting the light intensity by the light intensity setting switch, the duty factor is determined by the microcomputer and the light control signal is produced to attain the effect of the present invention.

In accordance with the present invention, by converting the light control signal of the light control signal generator to the light signal, the light control signal generator is perfectly electrically isolated from the primary power supply circuit of the exposure amount control circuit. Accordingly, a highly safe exposure amount control device is provided. Since the light signal is an on-off signal, the control is stable.

We claim:

1. An exposure amount control device for a copying machine comprising:
   (a) exposure amount control means for controlling an exposure amount by controlling light of an exposure lamp for illuminating an original document to be copied; and
   (b) digital light control signal generating means for supplying a digital light control signal of a variable duty factor to said exposure amount control means;
   wherein said digital light control signal generating means includes a light intensity increase switch, a light intensity decrease switch, a microcomputer, a frequency dividing counter and an oscillator, said light intensity increase switch and said light intensity decrease switch being connected to input terminals of said microcomputer, bus means for supplying data from said microcomputer to said frequency dividing counter, means for supplying a clock pulse from said oscillator to said frequency dividing counter, means for supplying an output signal of said frequency dividing counter to a first input terminal of a NAND circuit, means for applying a LAMP ON signal to a second input terminal of said NAND circuit, and means for supplying an output signal of said NAND circuit to said exposure amount control means as said digital light control signal.

2. An exposure amount control device for a copying machine comprising:
   (A) exposure amount control means for controlling an exposure amount of light of an exposure lamp for illuminating an original document to be copied and
   (B) digital light control signal generating means for supplying a digital light control signal of a variable duty factor to said exposure amount control means; wherein said exposure amount control means comprises;
   (a) a photosensor having a resistance which varies in response to a light signal supplied thereto;
   (b) pulse generator means connected to said photosensor for generating trigger pulses at a timing according to the resistance of said photosensor;
   (c) an AC control element connected to said pulse generator means so as to be turned on in response to said trigger pulses;
   (d) connecting means for connecting said exposure lamp with an AC power supply through said AC control element; and
   (e) light emitting means for emitting light onto said photosensor, said light emitting means being isolated in DC electrical sense from said photosensor, said pulse generator means, said AC control element, and said connecting means, within said exposure amount control means;
   and wherein said digital light control signal generating means includes;
   (f) light intensity increase/decrease setting means for generating a light intensity indicating signal; and
   (g) means including an oscillator for generating an oscillation output of a variable oscillation period in accordance with said light intensity indicating signal from said light intensity increase/decrease setting means, the oscillation output of said oscillator being supplied to said light emitting means as said digital light control signal; said digital light control signal generating means being isolated in a DC electrical sense from said photosensor, said pulse generator, said AC control element, and said connecting means, within said exposure amount control means.

* * * * *